(12) United States Patent
Kravitz

(10) Patent No.: US 11,447,058 B2
(45) Date of Patent: Sep. 20, 2022

(54) TRUCK CAB BED RESTRAINT APPARATUS

(71) Applicant: Jay Kravitz, Concord, NC (US)

(72) Inventor: Jay Kravitz, Concord, NC (US)

( * ) Notice: Subject to any disclaimer, the term of this patent is extended or adjusted under 35 U.S.C. 154(b) by 459 days.

(21) Appl. No.: 16/659,229

(22) Filed: Oct. 21, 2019

(65) Prior Publication Data

US 2021/0114506 A1    Apr. 22, 2021

(51) Int. Cl.
*B60P 3/38* (2006.01)
*A47C 21/08* (2006.01)
*B62D 33/06* (2006.01)
*B60R 21/00* (2006.01)

(52) U.S. Cl.
CPC .............. *B60P 3/38* (2013.01); *A47C 21/08* (2013.01); *B60R 2021/0034* (2013.01); *B62D 33/0612* (2013.01)

(58) Field of Classification Search
CPC . A47C 21/08; A47C 17/80; B60P 3/38; B60R 2021/0034
See application file for complete search history.

(56) References Cited

U.S. PATENT DOCUMENTS

| 2,611,909 | A | * | 9/1952 | Dillon | .................. | A61G 7/0507 |
| | | | | | | 5/426 |
| 5,375,879 | A | | 12/1994 | Williams | | |
| 5,536,042 | A | | 7/1996 | Wiiliams | | |
| 5,876,059 | A | | 3/1999 | Kleinberg | | |
| D411,506 | S | | 6/1999 | Davis | | |
| 6,428,044 | B1 | * | 8/2002 | Ghantae | ................... | B60R 21/06 |
| | | | | | | 280/805 |
| 7,631,896 | B2 | | 12/2009 | Jessup | | |
| 7,703,803 | B2 | | 4/2010 | Ekberg | | |
| 9,126,553 | B2 | | 9/2015 | Langhoff | | |
| 2017/0245650 | A1 | * | 8/2017 | Leng | ...................... | A47C 19/20 |

FOREIGN PATENT DOCUMENTS

| AU | 2008101106 A4 | * | 12/2008 | ............. A47C 19/20 |
| CN | 107647680 A | * | 2/2018 | |

* cited by examiner

*Primary Examiner* — James A English

(57) ABSTRACT

A truck cab bed restraint apparatus for keeping a sleeping co-driver safely secured in a bunk includes a barrier comprising a left half and a right half. A hinge is coupled to the barrier. The left half and the right half swingingly move between an extended position and an alternate folded position. The barrier in the extended position is configured to be selectively engageable between a mattress and a pair of cabinets of a cab of a semi-truck. A plurality of bar guides is coupled to the barrier. A bar is coupled to the plurality of bar guides. The bar is slidably engaged within a bar aperture of the plurality of bar guides. The bar secures the barrier in the extended position when engaged within at least one bar guide coupled to each of the left half and the right half.

7 Claims, 6 Drawing Sheets

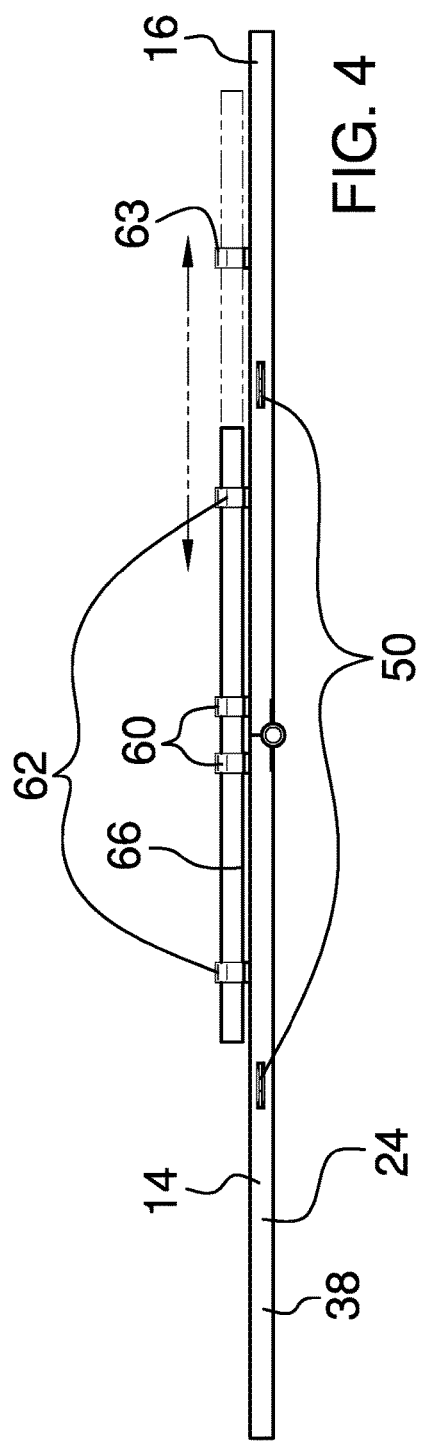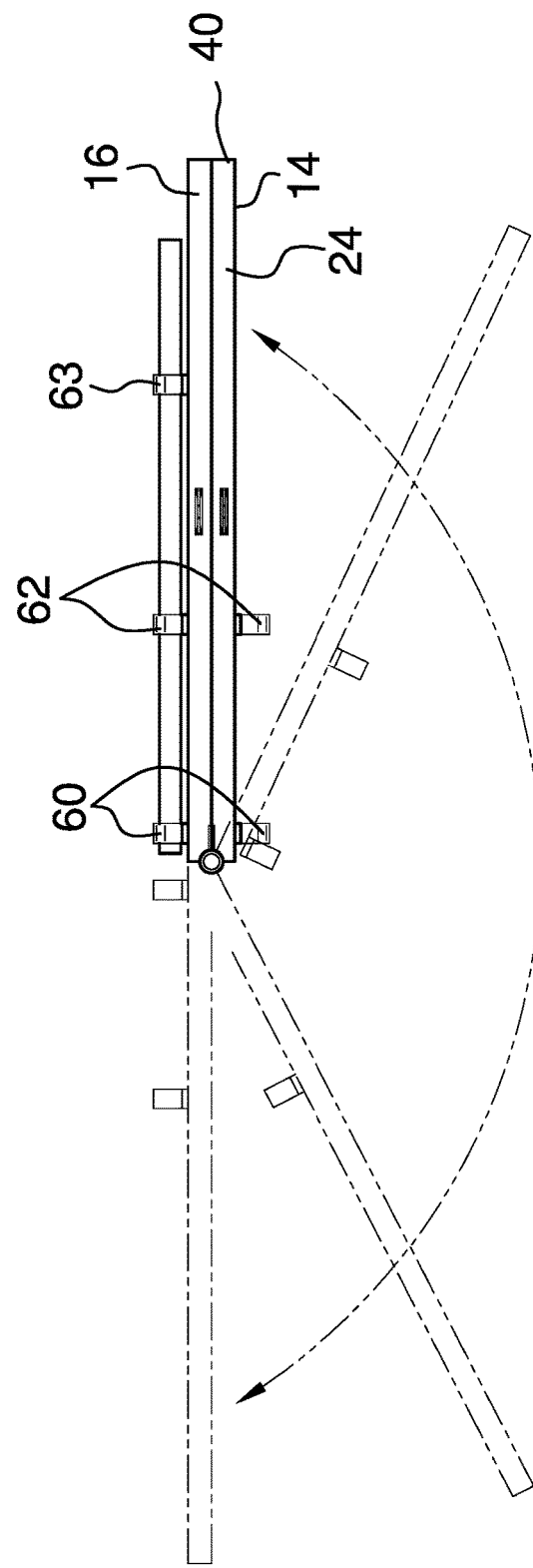

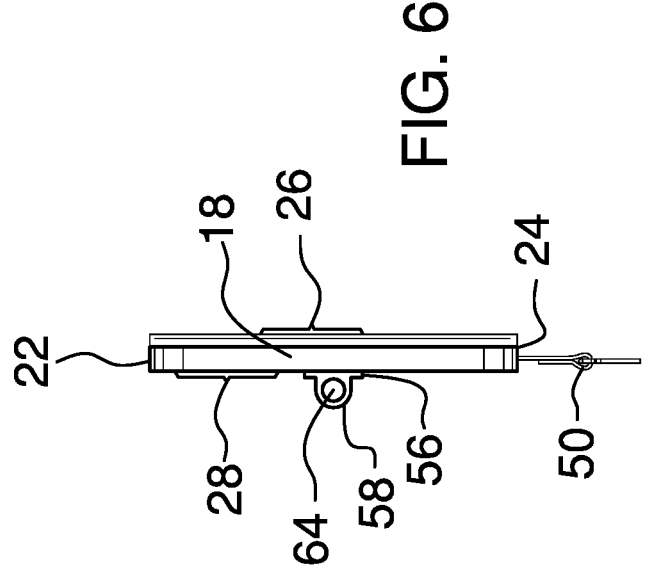

TRUCK CAB BED RESTRAINT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to trucking safety devices and more particularly pertains to a new trucking safety device for keeping a sleeping co-driver safely secured in a bunk.

BRIEF SUMMARY OF THE INVENTION

An embodiment of the disclosure meets the needs presented above by generally comprising a barrier comprising a left half and a right half. Each of the left half and the right half has an outer edge, an inner edge, an upper edge, a lower edge, an inner face, and an outer face. A hinge is coupled to the inner edge of each of the left half and the right half of the barrier. The left half and the right half swingingly move between an extending position and an alternate folded position. The left half and the right half in the extended position lie coplanar and the inner face of the left half and the right half touch in the folded position. The barrier in the extended position is configured to be selectively engageable between a mattress and a pair of cabinets of a cab of a semi-truck. A plurality of bar guides is coupled to the barrier. The plurality of bar guides comprises at least two bar guides coupled to the outer face of each of the left half and the right half. Each of the plurality of bar guides has a bar aperture extending therethrough. The bar aperture of each bar guide is coaxially aligned with the barrier in the extended position. A bar is coupled to the plurality of bar guides. The bar is slidably engaged within the bar aperture of the plurality of bar guides. The bar secures the barrier in the extended position when engaged within at least one bar guide coupled to each of the left half and the right half.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a bottom plan view of an embodiment of the disclosure.

FIG. 5 is a bottom plan view of an embodiment of the disclosure.

FIG. 6 is a side elevation view of an embodiment of the disclosure.

DETAILED DESCRIPTION OF THE INVENTION

Figure 1:
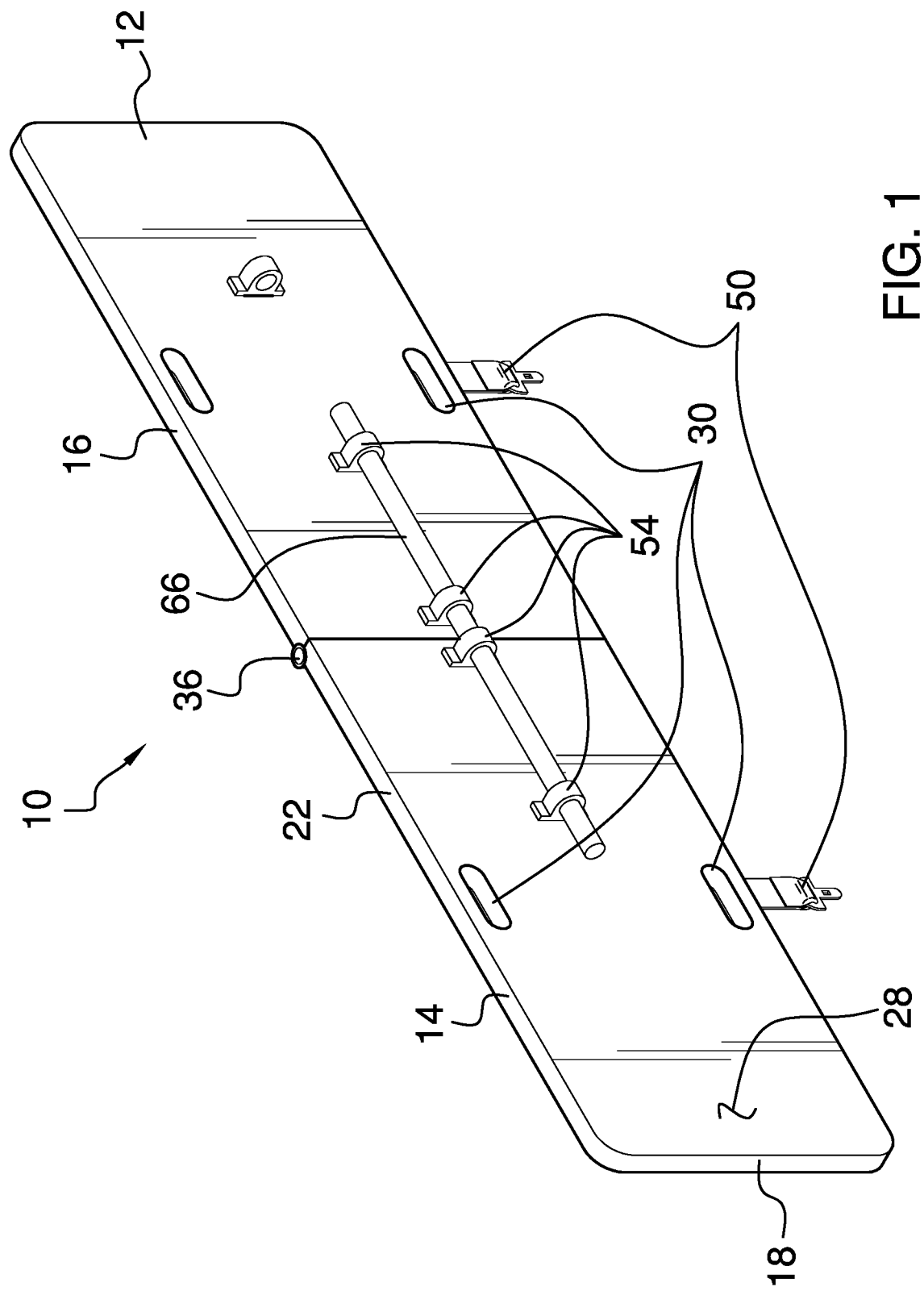
FIG. 1 is an isometric view of a truck cab bed restraint apparatus according to an embodiment of the disclosure.
Figure 2:
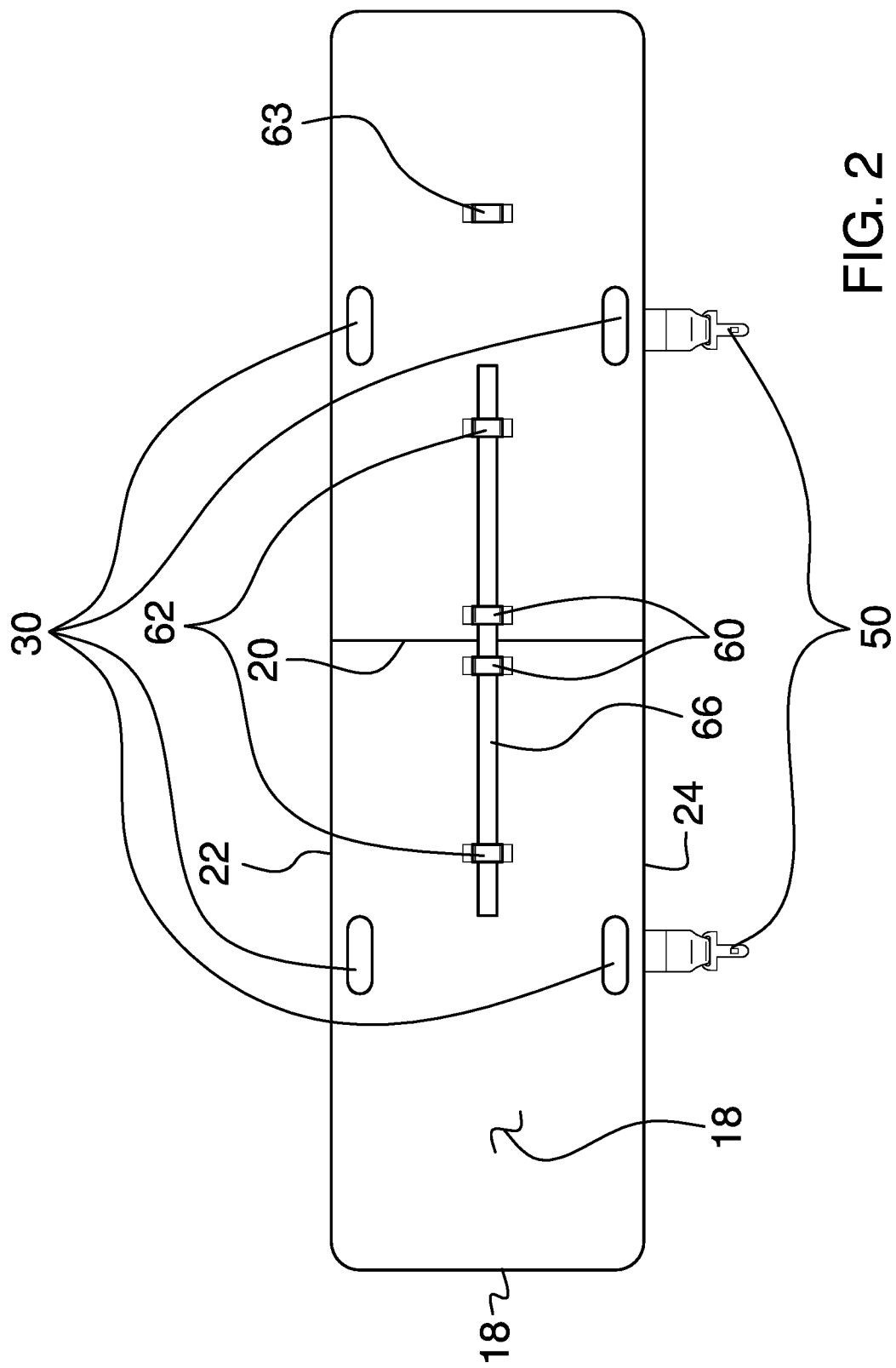
FIG. 2 is a front elevation view of an embodiment of the disclosure.
Figure 3:
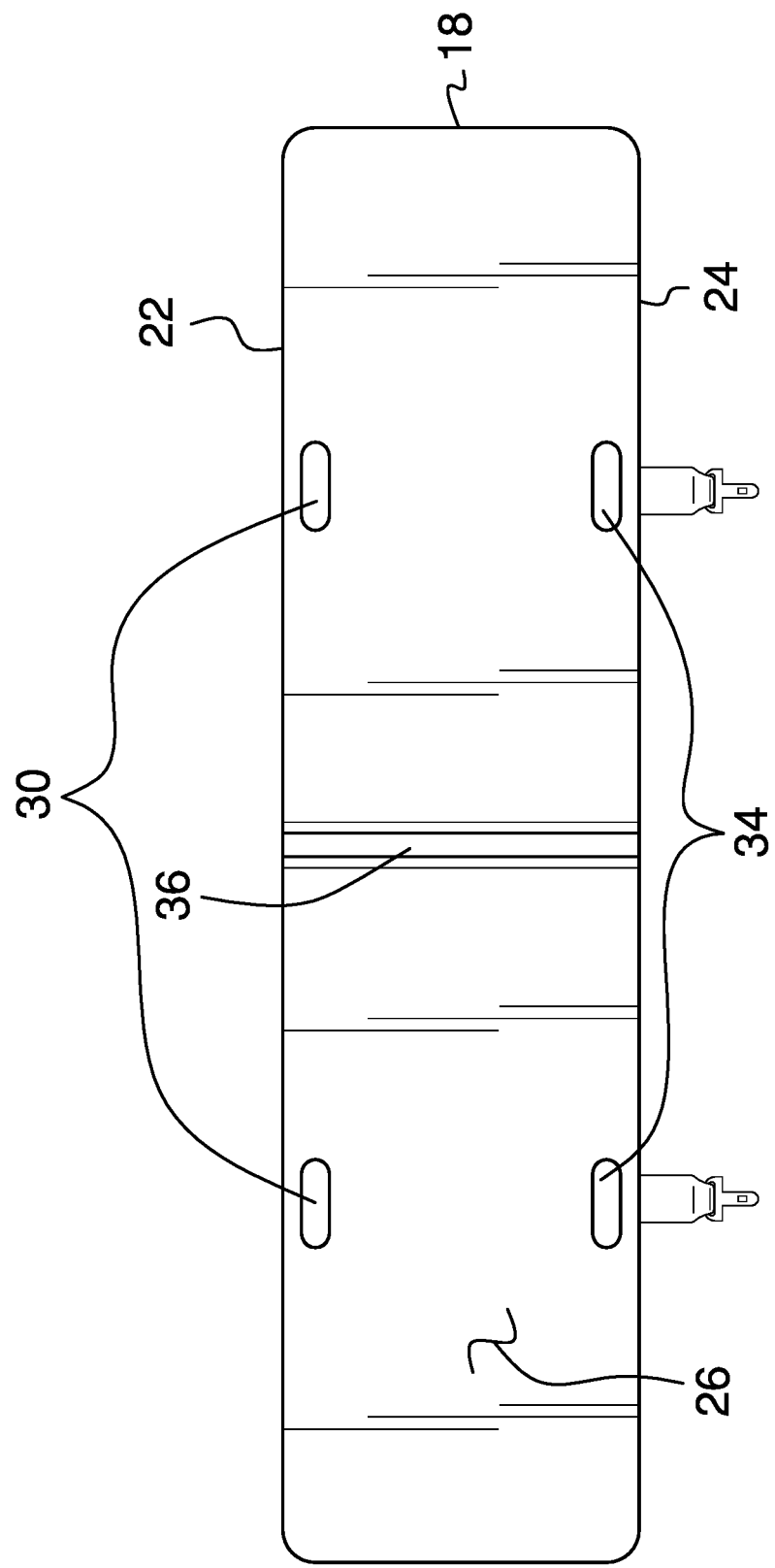
FIG. 3 is a rear elevation view of an embodiment of the disclosure.
Figure 7:
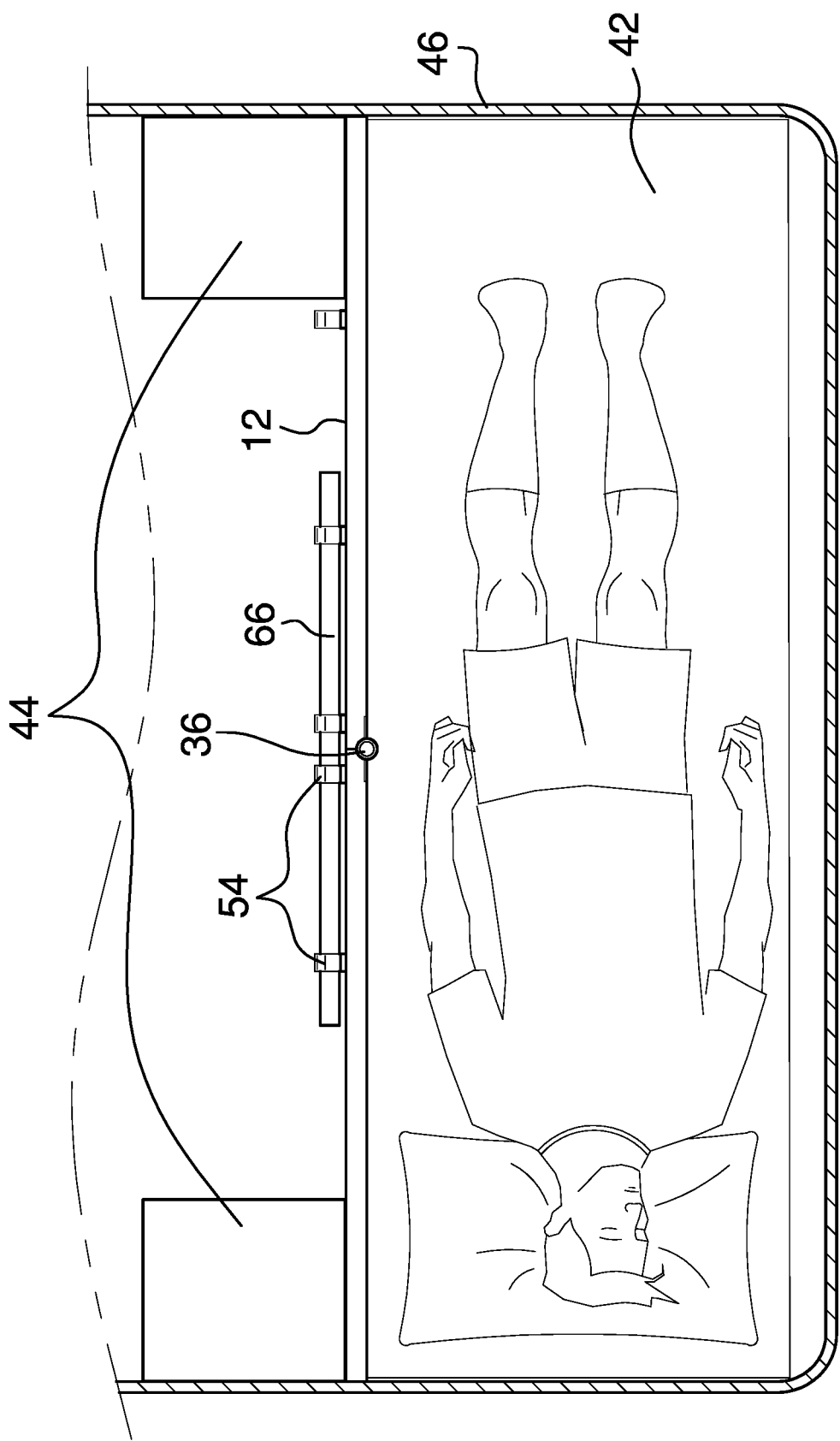
FIG. 7 is an in-use view of an embodiment of the disclosure.

With reference now to the drawings, and in particular to FIGS. 1 through 7 thereof, a new trucking safety device embodying the principles and concepts of an embodiment of the disclosure and generally designated by the reference numeral 10 will be described.

As best illustrated in FIGS. 1 through 7, the truck cab bed restraint apparatus 10 generally comprises a barrier 12 comprising a left half 14 and a right half 16. Each of the left half 14 and the right half 16 have an outer edge 18, an inner edge 20, an upper edge 22, a lower edge 24, an inner face 26, and an outer face 28. Each of the left half 14 and the right half 16 is rectangular and has rounded corners between the outer edge 18 and the upper edge 22 and the outer edge 18 and the lower edge 24. Each of the left half 14 and the right half 16 has a plurality of handle apertures 30 extending from the inner face 26 through the outer face 28. The plurality of handle apertures 30 comprises an upper handle aperture 32 adjacent the upper edge 22 and a lower handle aperture 34 adjacent the lower edge 24 of each of the left half 14 and the right half 16. A hinge 36 is coupled to the inner edge 20 of each of the left half 14 and the right half 16 of the barrier. The left half 14 and the right half 16 swingingly move between an extended position 38 and an alternate folded position 40. The left half 14 and the right half 16 in the extended position 38 lie coplanar and the inner face 26 of the left half 14 and the right 16 half touch in the folded position 40. The barrier 12 in the extended position 38 is configured to be selectively engageable between a mattress 42 and a pair of cabinets 44 of a cab 46 of a semi-truck. A pair of seatbelt connectors 50 is coupled to the barrier 12. The pair of seatbelt connectors 50 is coupled to the lower edge 24 of each of the left half 14 and the right half 16. The pair of seatbelt connectors 50 is configured to engage with a pair of seatbelt buckles of the cab 46.

A plurality of bar guides 54 is coupled to the barrier 12. Each of the bar guides 54 has a base portion 56 coupled to the inner face 26 and a rounded extension portion 58. The plurality of bar guides 54 comprises a pair of inner guides 60 coupled proximal the inner edge 20 of each of the left half 14 and the right half 16, a pair of second guides 62 coupled to the left half 14 and the right half 16, and a third guide 63 coupled to the right half 16 between the second guide 62 and the outer edge 18 of the right half 16. Each of the plurality of bar guides 54 has a bar aperture 64 extending through the extension portion 58. The bar aperture 64 of each bar guide 54 is coaxially aligned with the barrier 12 in the extended position 38. A bar 66 is coupled to the plurality of bar guides 54. The bar 66 is slidably engaged within the bar aperture 64 of the plurality of bar guides 54. The bar 66 has a length greater than a distance between the second guide 62 of the left half 14 and the second guide 62 of the right half 16. The bar 66 secures the barrier 12 in the extended position 38 when engaged within at least one bar guide 54 coupled to each of the left half 14 and the right half 16.

In use, the user moves left half 14 and right half 16 of the barrier to the extended position 38. The bar 66 is slid to secure the barrier 12 in the extended position 38 and the barrier 12 is then inserted between the mattress 42 and the pair of cabinets 44 to prevent the co-driver from ejecting from the bunk in case of a sudden stop or crash.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A truck cab bed restraint apparatus comprising:
    a barrier, the barrier comprising a left half and a right half, each of the left half and the right half having an outer edge, an inner edge, an upper edge, a lower edge, an inner face, and an outer face;
    a hinge coupled to the barrier, the hinge being coupled to the inner edge of each of the left half and the right half, the left half and the right half swingingly moving between an extended position and an alternate folded position, the left half and the right half in the extended position lying coplanar, the inner face of the left half and the right half touching in the folded position, the barrier in the extended position being configured to be selectively engageable between a mattress and a pair of cabinets of a cab of a semi-truck;
    a plurality of bar guides coupled to the barrier, the plurality of bar guides comprising at least two bar guides coupled to the outer face of each of the left half and the right half, each of the plurality of bar guides having a bar aperture extending therethrough, the bar aperture of each bar guide being coaxially aligned with the barrier in the extended position;
    a bar coupled to the plurality of bar guides, the bar being slidably engaged within the bar aperture of the plurality of bar guides, the bar securing the barrier in the extended position when engaged within at least one bar guide coupled to each of the left half and the right half; and
    the plurality of bar guides comprising a pair of inner guides coupled proximal the inner edge of each of the left half and the right half, a pair of second guides coupled to the left half and the right half, and a third guide coupled to the right half between the second guide of the right half and the outer edge of the right half, the bar having a length greater than a distance between the second guide of the left half and the second guide of the right half.

2. The truck cab bed restraint apparatus of claim 1 further comprising a pair of seatbelt connectors coupled to the barrier, the pair of seatbelt connectors being coupled to the lower edge of each of the left half and the right half, the pair of seatbelt connectors being configured to engage with a pair of seatbelt buckles of the cab.

3. The truck cab bed restraint apparatus of claim 1 further comprising each of the left half and the right half having a plurality of handle apertures extending from the inner face through the outer face.

4. The truck cab bed restraint apparatus of claim 3 further comprising the plurality of handle apertures comprising an upper handle aperture adjacent the upper edge and a lower handle aperture adjacent the lower edge of each of the left half and the right half.

5. The truck cab bed restraint apparatus of claim 1 further comprising each of the left half and the right half being rectangular and having rounded corners between the outer edge and the upper edge and the outer edge and the lower edge.

6. The truck cab bed restraint apparatus of claim 1 further comprising each of the bar guides having a base portion and a rounded extension portion, the bar aperture extending through the rounded extension portion.

7. A truck cab bed restraint apparatus comprising:
    a barrier, the barrier comprising a left half and a right half, each of the left half and the right half having an outer edge, an inner edge, an upper edge, a lower edge, an inner face, and an outer face, each of the left half and the right half being rectangular and having rounded corners between the outer edge and the upper edge and the outer edge and the lower edge, each of the left half and the right half having a plurality of handle apertures extending from the inner face through the outer face, the plurality of handle apertures comprising an upper handle aperture adjacent the upper edge and a lower handle aperture adjacent the lower edge of each of the left half and the right half;
    a hinge coupled to the barrier, the hinge being coupled to the inner edge of each of the left half and the right half, the left half and the right half swingingly moving between an extended position and an alternate folded position, the left half and the right half in the extended position lying coplanar, the inner face of the left half and the right half touching in the folded position, the barrier in the extended position being configured to be selectively engageable between a mattress and a pair of cabinets of a cab of a semi-truck;

a pair of seatbelt connectors coupled to the barrier, the pair of seatbelt connectors being coupled to the lower edge of each of the left half and the right half, the pair of seatbelt connectors being configured to engage with a pair of seatbelt buckles of the cab;

a plurality of bar guides coupled to the barrier, each of the bar guides having a base portion coupled to the inner face and a rounded extension portion, the plurality of bar guides comprising a pair of inner guides coupled proximal the inner edge of each of the left half and the right half, a pair of second guides coupled to the left half and the right half, and a third guide coupled to the right half between the second guide of the right half and the outer edge of the right half, each of the plurality of bar guides having a bar aperture extending through the extension portion, the bar aperture of each bar guide being coaxially aligned with the barrier in the extended position; and a bar coupled to the plurality of bar guides, the bar being slidably engaged within the bar aperture of the plurality of bar guides, the bar having a length greater than a distance between the second guide of the left half and the second guide of the right half, the bar securing the barrier in the extended position when engaged within at least one bar guide coupled to each of the left half and the right half.

* * * * *